United States Patent Office 3,716,563
Patented Feb. 13, 1973

3,716,563
PREPARATION OF EPOXIDE COMPOUNDS BY EPOXIDIZING OLEFINS WITH PREFORMED ORGANOPEROXYBORON COMPOUNDS
Jean-Claude Brunie and Noël Crenne, Lyon, France, assignors to Rhone-Poulenc S.A., Paris, France
No Drawing. Filed May 27, 1966, Ser. No. 553,283
Claims priority, application France, June 1, 1965, 19,139
The portion of the term of the patent subsequent to Jan. 2, 1990, has been disclaimed
Int. Cl. C07d 1/08
U.S. Cl. 260—348.5 L                    3 Claims

ABSTRACT OF THE DISCLOSURE

Epoxidized compounds are manufactured by oxidizing olefinic compounds with triorganoperoxyboranes as epoxidizing agent.

This invention relates to the manufacture of epoxidised compounds by oxidation of olefinic compounds.

The most extensively used industrial process for the manufacture of epoxides consists of reacting olefinic compounds with peracids such as performic, peracetic or perbenzoic acids [Adams, Organic Reactions VII, pp. 378, 433 (1953)]. This method gives good yields but it uses expensive oxidising agents. Furthermore, it requires working in an acid medium, which is not always compatible with the stability of the products which have to be treated, and in certain cases the epoxide produced reacts with the acid to give a glycol ester, thereby reducing the yield of epoxide. In order to avoid these disadvantages the organic peracids have been replaced by alkyl hydroperoxides, but the formation of the epoxide then only takes place very slowly and with poor yields. Thus Brill [Journal of Organic Chemistry 29, 710–713 (1964)] obtained yields of only 10 to 30% of epoxide based on the hydroperoxide consumed when oxidising cycloolefines by means of t-butyl hydroperoxide. Epoxidation of olefines such as propylene and butene by hydroperoxides, in the presence of catalytic amounts of a molybdenum compound, yields based on the hydroperoxide used of the order of 50% (Belgian patent specification No. 644,090).

Finally, various methods of oxidising olefines either in the gaseous phase or in the liquid phase, with air have been suggested for the preparation of epoxides, but the oxidation of olefines in the gaseous phase requires high pressures and oxidation in the liquid phase most frequently gives rise to the simultaneous formation of unsaturated glycols and alcohols.

It has now been found that epoxide compounds can be prepared in good yields from olefinic compounds if tri(organoperoxy) boranes of formula B(OOR)$_3$, in which R represents an alkyl, cycloalkyl or aralkyl radical, are used as the oxidising agents. The formation of the desired epoxide is accompanied by the formation of the borate ester corresponding to the tri(organoperoxy) borane used.

The process of the invention may be used with aliphatic, cycloaliphatic and araliphatic olefines such as ethylene, propylene, butenes, cyclohexene, cyclooctene, cyclododecene and styrene, and with diolefines or polyolefines such as butadiene, isoprene, cyclopentadiene, cyclooctadiene, cyclododecadiene and cyclododecatriene. Equally, olefinic compounds having substituents which are non-oxidisable and remain stable under the reaction conditions, for example olefines substituted by halogen atoms or alkoxy groups, may be oxidised. For simplicity such substituted olefines will hereinafter sometimes be included within the term "olefines."

The amounts of tri(organoperoxy) borane to be used for the formation of the epoxide can vary according to the reaction conditions. Theoretically, it suffices to react 3 molecules of the compound to be epoxidised with one molecule of tri(organoperoxy) borane. In practice an excess of the substance to be epoxidised will generally be used because it serves as a diluent, particularly when dealing with a liquid olefine such as cyclohexene.

The residual unoxidised olefine is thereafter easily recovered by simple distillation. If the olefine to be oxidised is normally in the gaseous state at the reaction temperature, the reaction can be carried out under an inert gas pressure which is sufficient to maintain the olefine in the liquid phase. In the case of liquid olefines the reaction can be carried out at normal pressure by simply heating the reagents until the peroxyborane has completely disappeared.

Though most frequently it is not necessary to resort to a separate diluent, the reaction may nevertheless in some cases be carried out in the presence of a diluent which is inert under the working conditions.

Thus the reaction mixture may be diluted by diluents which are inert towards the peroxyboranes under the working conditions. Otherwise expressed, diluents may be used which for practical purposes are not oxidised by the peroxyboranes in the presence of the olefines; under the working conditions, that is to say organic liquids may be used whose rate of oxidation is very low compared to the rate of epoxidation of the olefine at the selected temperature, which is generally below 125° C. For example alkanes such as hexane and heptane, cycloalkanes such as cyclohexane, and aromatic hydrocarbons and substituted hydrocarbons such as benzene, chlorobenzene, nitrobenzene and cumene may be used.

When the reaction is complete the epoxidised compound can be separated by simple distillation, as also can unconverted olefine, or some other equivalent means may be used.

The tri(organoperoxy) boranes which are used as oxidising agents are derivatives of primary, secondary or tertiary aliphatic, cycloaliphatic or araliphatic hydroperoxides; they may with advantage be obtained by reacting an alkyl, cycloalkyl or aralkyl hydroperoxide of formula ROOH (R being as before alkyl, cycloalkyl or aralkyl) with a borate ester B (OR')$_3$ of a lower alkanol, according to the reaction:

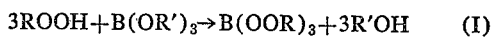

$$3ROOH + B(OR')_3 \rightarrow B(OOR)_3 + 3R'OH \qquad (I)$$

in which R' represents a lower alkyl (C$_1$ to C$_4$) radical, particularly methyl or ethyl. In practice, these tri(organoperoxy) boranes are prepared by heating a mixture of the hydroperoxide and lower alkyl borate (more particularly methyl borate) gently (generally below 90° C.) so as not to decompose the hydroperoxide, the heating being carried out under nitrogen, optionally in the presence of an appropriate organic solvent, while distilling off the alcohol R'OH liberated in the reaction as it is formed, and working under an appropriate reduced pressure if necessary.

If the oxidation of the olefine is to be carried out in the presence of a diluent, then the tri(organoperoxy) borane may with advantage be prepared in the presence of an organic diluent which is compatible with all the intended operations. It is not necessary that the tri(organoperoxy) borane should be a pure product. A more or less technical quality of peroxyborane may be used, which may for example be obtained by reaction of methyl borate with a technical solution of hydroperoxide obtained by oxidising a hydrocarbon RH by means of air or oxygen, this solution preferably being freed from acid products formed during this oxidation; such a technical solution of hydroperoxide may be used at the dilution at which it is obtained from the oxidising vessel, or after some degree of concentration.

As the tri(organoperoxy) borane, tri(cyclohexylperoxy) borane is particularly suitable; its decomposition takes place rapidly under the reaction conditions, and it is a product which is easily obtainable because the cyclohexyl hydroperoxide used for its manufacture is a cheap industrial product. However other tri(organoperoxy) boranes may be equally suitable, for example tri(1-phenyl-1-methyl-ethylperoxy) borane and tri(1-phenylethylperoxy) borane.

The following examples illustrate the invention; proportions are by weight.

EXAMPLE 1

81 g. of cyclohexene and 8.5 g. of tri(cyclohexylperoxy) borane of 84% purity are charged into a 250 cc. flask fitted with a stirrer unit and a reflux condenser, and connected to a source of nitrogen. The reaction is allowed to take place for 20 minutes at ambient temperature and the mixture is then gently heated under reflux. After 20 minutes heating, the temperature becomes steady at 84° C.; heating is then continued for a further 1 hour. After cooling, the reaction mass contains no further hydroperoxide. 5 cc. of water are then added and the mixture allowed to stand for 30 minutes; boric acid precipitates and is filtered off. The filtrate is decanted and the aqueous hydrolysis layer is washed 3 times in 20 cc. of ether. The ethereal layers are then combined with the organic layer from the decantation. The solution so obtained is dried over anhydrous sodium sulphate and then poured into a graduated flask in which it is diluted to 250 cc. with ether. The epoxycyclohexane formed is determined by means of an 0.1 N solution of hydrochloric acid saturated with magnesium chloride (Mitchell, Organic Analysis, vol. I, p. 134); the amount found is 5 g., corresponding to a yield of 84.5% based on the tri(cyclohexylperoxy) borane used.

EXAMPLE 2

Working under the same conditions as in the preceding example, 81 g. of cyclohexene are reacted with 12 g. of tri(1-phenyl-1-methyl-ethylperoxy) borane of 87.8% strength. During heating under reflux the temperature becomes steady at 84° C. and heating is continued at this temperature for 5 hours. On treating the reaction mixture as above, an organic solution is obtained which contains 4.44 g. of epoxycyclohexane. Yield: 67% based on the peroxyborane used.

EXAMPLE 3

11.3 g. of tri(cyclohexylperoxy) borane of 81.2% strength are charged into a 250 cc. autoclave, purged with nitrogen, and then 45 g. of butadiene introduced. A nitrogen pressure of 20 bars is then established and the mixture is heated at 100° C. for 3 hours. After cooling, 100 g. of chlorobenzene are added and the mixture is degassed. On distilling the solution so obtained, a fraction weighing 20.8 g. and distilling at 70–126° C./760 mm. is collected, which is found to contain 4.43 g. of 3,4-epoxybutene-1. Yield: 81.7% based on the tri(cyclohexylperoxy) borane employed.

EXAMPLE 4

Working as in the preceding example, 12 g. of 80% pure tri(1-phenyl-ethylperoxy) borane and 47 g. of butadiene containing 0.2 g. of nitrobenzene are reacted. At the end of the reaction a fraction weighing 5.6 g. and of boiling range (760 mm.) 70°–126° C. is collected, which is found to contain 2.52 g. of 3,4-epoxybutene. Yield: 51% based on the peroxyborane employed.

EXAMPLE 5

The process is carried out as in the preceding example, using 10 g. of 80% pure tri(cyclohexylperoxy) borane and 90 g. of allyl chloride, at a nitrogen pressure of 10 bars, and heating at 100° C. for 2 hours. After cooling and degassing 2.41 g. of epichlorohydrin are found in the reaction mixture. Yield 38.4% based on the tri(cyclohexylperoxy) borane.

EXAMPLE 6

5.9 g. of 81.2% pure tri(cyclohexylperoxy) borane are charged into a 250 cc. autoclave. The autoclave is purged with nitrogen, after which 25 g. of propylene are introduced, and the mixture heated at 80° C. for 2 hours under a nitrogen pressure of 40 bars. After cooling the autoclave, 100 cc. of anhydrous benzene are injected and the excess propylene is vented. Analysis of the reaction mixture shows that 11.7% of the peroxidic oxygen has not reacted. 1.84 g. of 1,2-epoxypropane are directly determined in the reaction mixture. Yield: 79% based on the tri(cyclohexylperoxy) borane employed and 90% based on the peroxyborane consumed.

EXAMPLE 7

Working as indicated in the preceding example, 8.1 g. of 82.7% pure tri(1-phenyl-ethylperoxy) borane and 31 g. of propylene are reacted. After cooling and adding 75 cc. of anhydrous benzene, analysis of the reaction mixture shows that 10.3% of the peroxidic oxygen has not reacted and that 1.95 g. of 1,2-epoxypropane have been produced. The yield is thus 70.6% based on the peroxyborane employed and 78.6% based on the peroxyborane consumed.

EXAMPLE 8

A mixture of the following components is heated at boiling temperature for 2 hours, in a nitrogen atmosphere: 14.2 g. of ethyl crotyl ether, 23.3 g. of anhydrous benzene and 12.34 g. of tri(cyclohexylperoxy) borane of 73.8% purity.

After cooling, analysis of the reaction mixture shows that 92% of the tri(cyclohexylperoxy) borane has reacted to produce 6.76 g. of 1-ethoxy-2,3-epoxybutane, which was identified by spectrography of the material after distillation. The yield is 83% based on the peroxyborane consumed.

EXAMPLE 9

176 g. of anhydrous benzene and 100.3 g. of a solution containing 44.55% of tri(cyclohexylperoxy) borane are introduced into a 1 litre autoclave fitted with a shaker. After the autoclave has been purged with nitrogen, 93.5 g. of propylene are introduced, the mixture is heated at 105° C. for 1½ hours under its own pressure, the autoclave is cooled, and excess undissolved gaseous propylene is recovered by venting. A determination carried out on the mixture shows that 10.4% of the peroxyborane employed still remains. On distillation, the dissolved propylene is collected, followed by 16.55 g. of propylene oxide. Methanolysis of the residue additionally yields 44.9 g. of cyclohexanol and 4.9 g. of cyclohexanone. A total of 76.3 g. of propylene is recovered.

The tri(cyclohexylperoxy) borane used as the starting material was obtained by reacting methyl orthoborate with a 4% technical solution of cyclohexyl hydroperoxide in cyclohexane, obtained by oxidising cyclohexane with air followed by concentration.

EXAMPLE 10

Example 9 is repeated, but extending the reaction period to two and a half hours; it is then found that 96.4% of the peroxyborane has reacted and that the yield of propylene oxide is about 79% based on the tri(cyclohexylperoxy) borane employed.

What is claimed is:

1. The method of preparing an oxirane compound which comprises reacting at elevated temperature in the liquid phase an olefinic compound in the presence of a preformed oganoperoxyboron compound.

2. In a process for the manufacture of an epoxidized compound by contacting an olefinic compound in the liquid phase at elevated temperature but below 125° C. with an epoxidizing agent and isolating the epoxidized compound formed, the improvement which consists in contacting at least 3 molecular proportions of the said olefinic compound with, as epoxidizing agent, a preformed solution containing one molecular proportion of a tri(organoperoxy)borane of formula: $B(OOR)_3$, in which R is alkyl, cycloalkyl, or aralkyl.

3. The improvement of claim 2 wherein tri(cyclohexylperoxy)borane is used as the epoxidizing agent.

References Cited

UNITED STATES PATENTS 2,801,253 7/1957 Greenspan et al. _ 260—348.5 LL

FOREIGN PATENTS 655,676 1/1963 Canada _____ 260—348.5 LL

OTHER REFERENCES

Organoboron Chem., by Steinberg, 1964, pp. 478–83, vol. I.

Chem. Review, vol. 45, August 1949, Swern, pp. 16, 17, 23–25.

JOHN D. RANDOLPH, Primary Examiner

S. D. WINTERS, Assistant Examiner

U.S. Cl. X.R.

260—462 R